(12) United States Patent
Makhlouf et al.

(10) Patent No.: US 9,648,567 B2
(45) Date of Patent: May 9, 2017

(54) SYSTEM AND METHOD FOR DETECTION OF EXTERNAL UPLINK INTERFERENCE IN CELLULAR NETWORK

(71) Applicant: MOTOROLA SOLUTIONS, INC., Schaumburg, IL (US)

(72) Inventors: Isam Robert Makhlouf, Lake Zurich, IL (US); Eirene Shipkowitz Smith, Deerfield, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 62 days.

(21) Appl. No.: 14/689,694

(22) Filed: Apr. 17, 2015

(65) Prior Publication Data

US 2016/0309419 A1 Oct. 20, 2016

(51) Int. Cl.
*H04W 52/24* (2009.01)
*H04W 24/08* (2009.01)
*H04B 17/345* (2015.01)

(52) U.S. Cl.
CPC ........ *H04W 52/243* (2013.01); *H04B 17/345* (2015.01); *H04W 24/08* (2013.01)

(58) Field of Classification Search
None
See application file for complete search history.

(56) References Cited

U.S. PATENT DOCUMENTS

| | | | |
|---|---|---|---|
| 8,385,832 B2 | 2/2013 | Johansson et al. | |
| 8,515,353 B2 | 8/2013 | Hiltunen et al. | |
| 8,849,340 B2 | 9/2014 | Whinnett | |
| 9,270,798 B2 * | 2/2016 | French | H04M 1/2535 |
| 2007/0060186 A1 * | 3/2007 | Ganesan | H04L 41/06 |
| | | | 455/522 |
| 2012/0329399 A1 | 12/2012 | Tokgoz et al. | |
| 2014/0024735 A1 | 1/2014 | Harders et al. | |
| 2015/0282010 A1 * | 10/2015 | Yang | H04W 36/0016 |
| | | | 455/437 |
| 2016/0101729 A1 * | 4/2016 | Burke | G01S 13/931 |
| | | | 701/36 |
| 2016/0183268 A1 * | 6/2016 | Albano | H04L 12/2634 |
| | | | 370/252 |

* cited by examiner

*Primary Examiner* — Chi H Pham
*Assistant Examiner* — Shick Hom
(74) *Attorney, Agent, or Firm* — Michael Best & Friedrich LLP (57) ABSTRACT

A method and apparatus for detecting external interference on an uplink channel of a serving cell in a communication network, such as a Long Term Evolution (LTE) network. Detecting external interference includes identifying neighbor cells of the serving cell and obtaining neighbor cell data associated with each neighbor cell. For each neighbor cell, a processor estimates a noise-rise contribution resulting from communication between the neighbor cell and user equipment based on the neighbor cell data. The processor generates a noise-rise threshold for the serving cell based on the noise-rise contributions estimated for the neighbor cells. Thereafter, the processor obtains a noise-rise measurement at the serving cell and generates an alert indicating external interference when the noise-rise measurement exceeds the noise-rise threshold.

20 Claims, 7 Drawing Sheets

SYSTEM AND METHOD FOR DETECTION OF EXTERNAL UPLINK INTERFERENCE IN CELLULAR NETWORK

BACKGROUND OF THE INVENTION

Long Term Evolution (LTE) communication protocol is a standard for wireless communication in high speed communication networks. In LTE, a user device or user equipment is able to communicate with a base station (eNodeB) to upload or download data from a network communicatively connected to the base station (eNodeB). For example, this network may be part of or connected to the Internet. User equipment in communication with an eNodeB use a shared uplink communication channel that is divided into portions referred to as resource blocks (RBs). Each RB is associated with a particular bandwidth (e.g., 180 kilohertz (kHz)).

In some instances, one or more RBs of the uplink channel may experience interference from sources of electromagnetic radiation, whether unintentional or malicious. For example, uplink interference can originate unintentionally from broadcast television (TV) and radio, as well as maliciously from radio jamming sources.

Certain levels of interference on an uplink channel can cause data corruption, data loss, and data throughput degradation. Modern communication systems attempt to identify instances of uplink interference so that they may be able to mitigate the impact of the interference and/or eliminate the source of the interference. For instance, after determining that malicious external interference exists, proper authorities may be contacted to locate the source (e.g., through triangulation) and cease operation of the source. However, current systems are not always able to identify uplink interference.

Accordingly, there is a need for improved methods and devices of detecting external uplink interference in a cellular network.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments of the invention include a method of detecting external uplink interference at a serving cell. The method includes identifying neighbor cells of the serving cell, where the neighbor cells and the serving cell are part of a communication network. The method further includes obtaining neighbor cell data associated with each neighbor cell of the neighbor cells. For each neighbor cell, a noise-rise contribution resulting from communication between the each neighbor cell and one or more respective user devices is estimated based on the neighbor cell data of the each neighbor cell. A noise-rise threshold is then generated for the serving cell based on the noise-rise contributions estimated for the neighbor cells, and a noise-rise measurement at the serving cell is obtained. The method further includes generating an alert indicating external interference at the serving cell when the noise-rise measurement exceeds the noise-rise threshold.

Some embodiments of the invention include a management system for detecting external uplink interference at a serving cell. The management system includes a transceiver, a memory, and a processor. The transceiver is in communication with a core network and periodically receives performance indicators from the core network. The memory stores the received performance indicators, which includes information on cells that are in communication with the core network. The cells include the serving cell and neighbor cells of the serving cell, which are part of a communication network. The processor is in communication with the memory and transceiver and receives the performance indicators. The processor analyzes the performance indicators to thereby identify the neighbor cells of the serving cell, and obtains neighbor cell data associated with each neighbor cell of the neighbor cells. For each neighbor cell, the processor estimates a noise-rise contribution resulting from communication between the each neighbor cell and one or more respective user devices based on the neighbor cell data of the each neighbor cell. The processor then generates a noise-rise threshold for the serving cell based on the noise-rise contributions estimated for the neighbor cells and obtains a noise-rise measurement at the serving cell. The processor generates an alert indicating external interference at the serving cell when the noise-rise measurement exceeds the noise-rise threshold.

Figure 1:
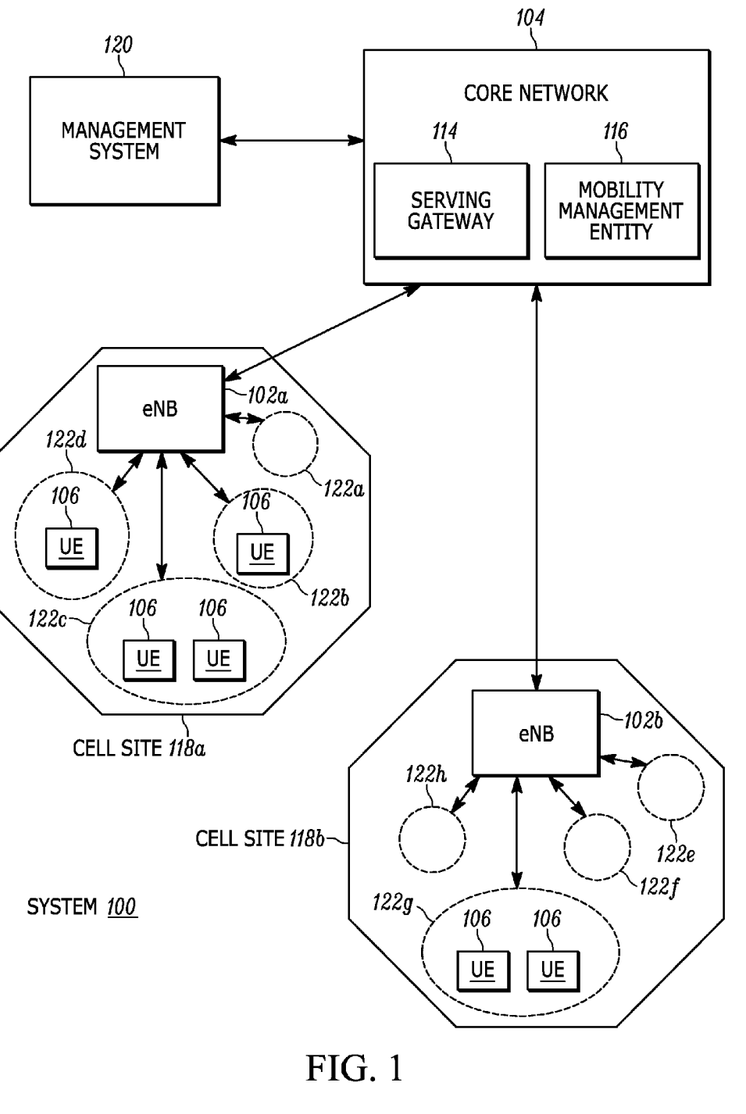
FIG. 1 illustrates a block diagram of a system used to detect external interference in an uplink channel of a communication network in accordance with some embodiments.

FIG. 1 is a block diagram of a system 100 used in accordance with some embodiments. The system 100 includes elements of a Long Term Evolution (LTE) system. System 100 includes multiple evolved Node Bs (eNBs) 102 (that is, eNBs 102a and 102b), each of which communicates directly with a core network 104 and with one or more user equipment (UE) 106, such as mobile telephones, smart telephones, tablets, or laptops. Core network 104 includes a serving gateway 114 and a mobility management entity 116. Serving gateway 114 routes incoming and outgoing internet protocol (IP) packets and anchors handover between eNBs 102. Mobility management entity 116 manages signaling related to mobility and security. System 100 also includes a management system 120 that collects cell characteristic data and key performance indicator (KPI) data (collectively, cell data), detects anomalies in the system 100 dependent on the cell data, and generates alarms indicative of the detected anomalies. Although FIG. 1 shows a broadband LTE system, embodiments may be implemented in any equivalent broadband communication system, narrowband communication system, or ad hoc communications system.

Each eNB 102 provides coverage to one or more cell areas and manages radio resources and mobility in corresponding cell sites 118 (that is, cell sites 118a and 118b) to optimize communication with connected user equipment 106. For example, eNB 102a provides coverage to cell areas 122a-d associated with cell site 118a and eNB 102b provides coverage to cell areas 122e-h associated with cell site 118b. Each cell area may be associated with one or more antennas of the eNB 102 (see, e.g., FIG. 3).

While cell sites 118a and 118b are shown in FIG. 1 as having a non-overlapping coverage area, in practice, cell sites 118 may overlap. Accordingly, as will be explained in more detail below, communications between a first user equipment 106 and eNB 102a may result in a level of interference with respect to communications between a second user equipment 106 and eNB 102b.

Figure 2:
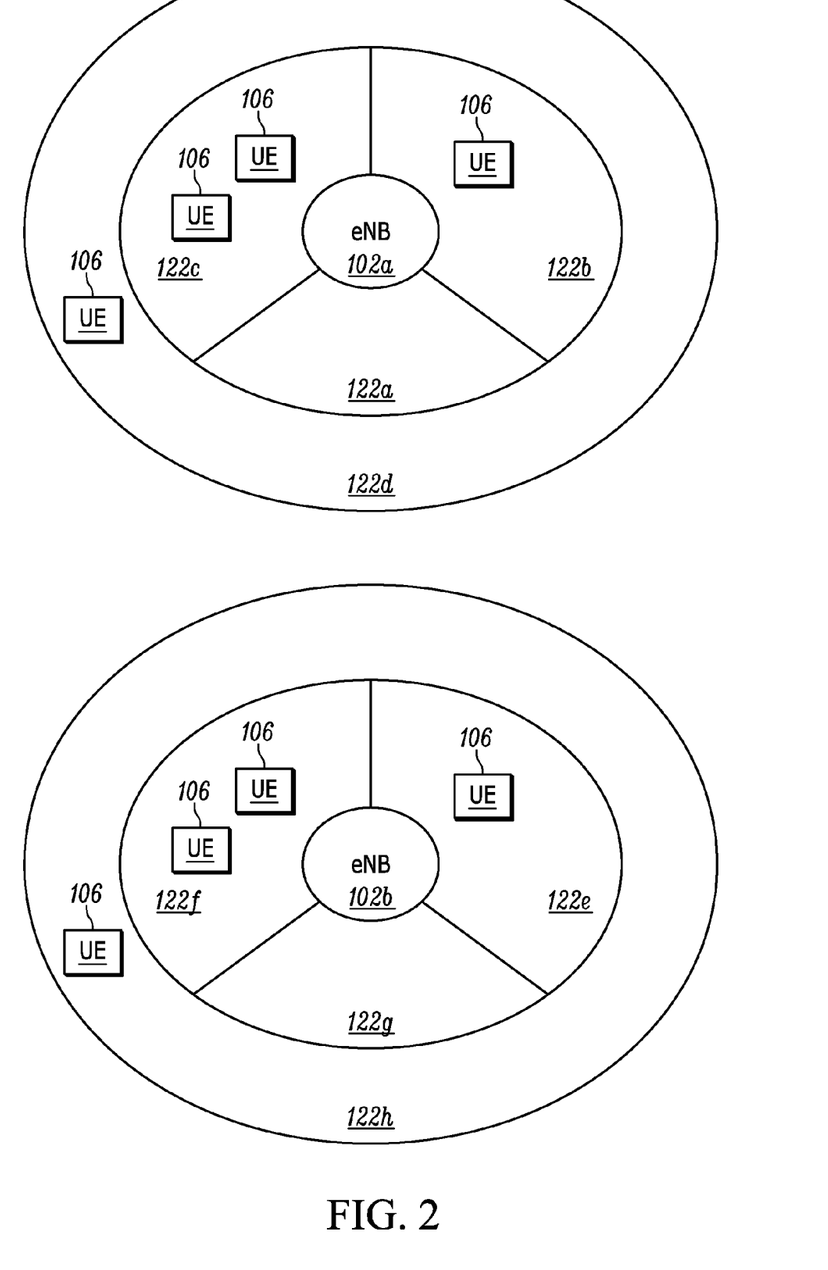
FIG. 2 illustrates example cell areas of eNodeBs shown in FIG. 1.

FIG. 2 illustrates an exemplary arrangement of the cell areas 122a-h of the eNB 102a and 102b. In FIG. 2, cell areas 122a-c and 122e-g are associated with respective directional antennas and provide directional coverage, while cell areas 122d and 122h are associated with respective omnidirectional antennas and provide omnidirectional coverage. The (directional) cell areas 122a-c and 122e-g each cover an approximately 120 degree range, and the (omnidirectional) cell areas 122d and 122h cover a 360 degree range. The cell areas 122a-h are generally referred to as cell areas 122. In some embodiments, cell sites 118 include different combinations of cell areas 122 and/or have cell areas 122 with different ranges (e.g., four directional cell areas each covering 90 degree and two omnidirectional cell areas).

Referring back to FIG. 1, user equipment 106 in each cell site 118 sends information to and receives information from core network 104 through the eNB 102 in the cell site 118 in which the user equipment operates. More particularly, user equipment 106 sends information to and receives information from core network 104 through an antenna of the eNB 102 associated with the cell area 122 in which the user equipment operates.

Figure 3:
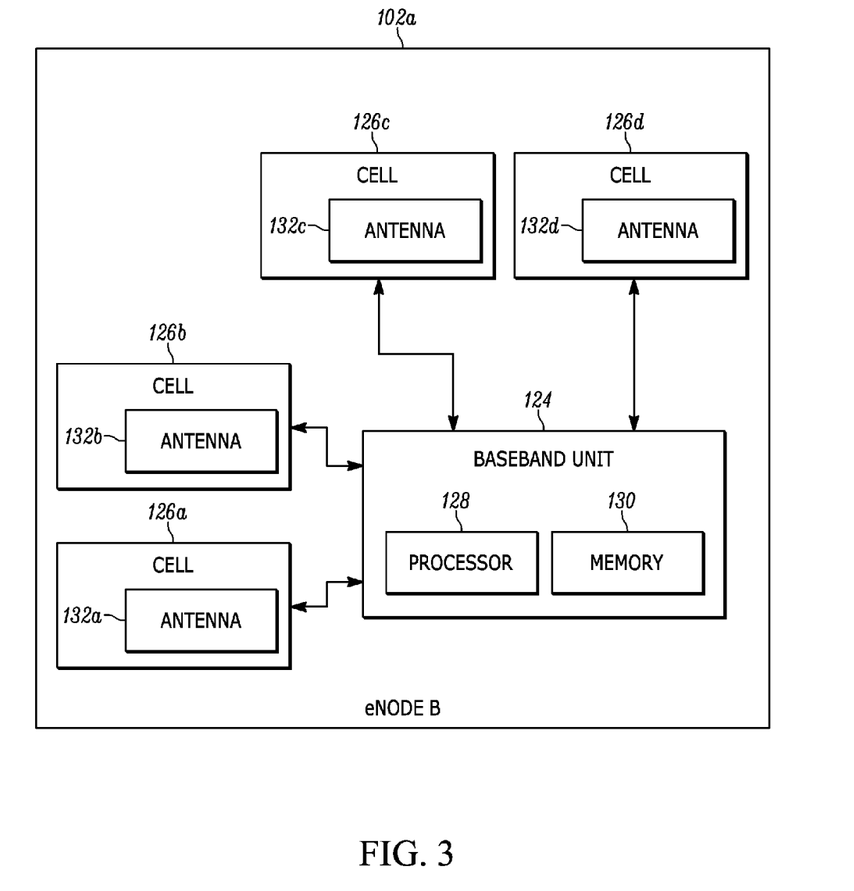
FIG. 3 illustrates a block diagram of an eNodeB shown in FIG. 1.

FIG. 3 illustrates a block diagram of the eNB 102a, although the illustration and description can be similarly applied to the eNB 102b. In the embodiment illustrated, the eNB 102a includes a baseband unit 124 and cells 126a-d, generally referred to as cells 126. Although one baseband unit 124 and four cells 126a-d are illustrated in FIG. 3, in practice, the eNB 102 may have more than one baseband unit 124, more or fewer cells 126, and different baseband-to-cell ratios.

The baseband unit 124 includes a processor 128 and memory 130. The memory 130 includes operational data for use by the processor 128 and program instructions for execution by the processor 128 enabling the baseband unit 124 to control the cells 126 to communicate with user equipment 106. Although a single processor 128 and memory 130 are illustrated, the baseband unit 124 may include two or more processors 128 and two or more memories 130 to implement the functionality of the baseband unit 128 described herein.

The cells 126 each include an antenna 132, identified as antennas 132a-d, respectively. Each cell 126 and its antenna 132 are associated with a cell area 122. For instance, the cells 126a, 126b, and 126c may have directional antennas 132a, 132b, and 132c, respectively, which are associated with cell areas 122a, 122b and 122c, respectively. Continuing with the example, the antenna 132d is omnidirectional and the cell 126d is associated with the omnidirectional cell area 122d. While the antenna 132 of each cell 126 is described in the singular, in practice, each antenna 132 may include more than one antenna (e.g., two, four, or eight). Thus, for instance, the antenna 132a of cell 126a may include four antennas used to cover the cell site 122a.

In the system 100 of FIG. 1, for example, the level of interference that each of the cells 126 will experience is impacted by the communication activity of other nearby cells 126. When looking at the interference level of a particular one of the cells 126, that cell may be referred to as a serving cell. The other nearby cells 126 may be referred to as neighbor cells. Other cells 126 that are not nearby, but part of the same communication network (e.g., communicatively coupled to the core network 104), may be referred to as non-neighbor cells.

Figure 4:
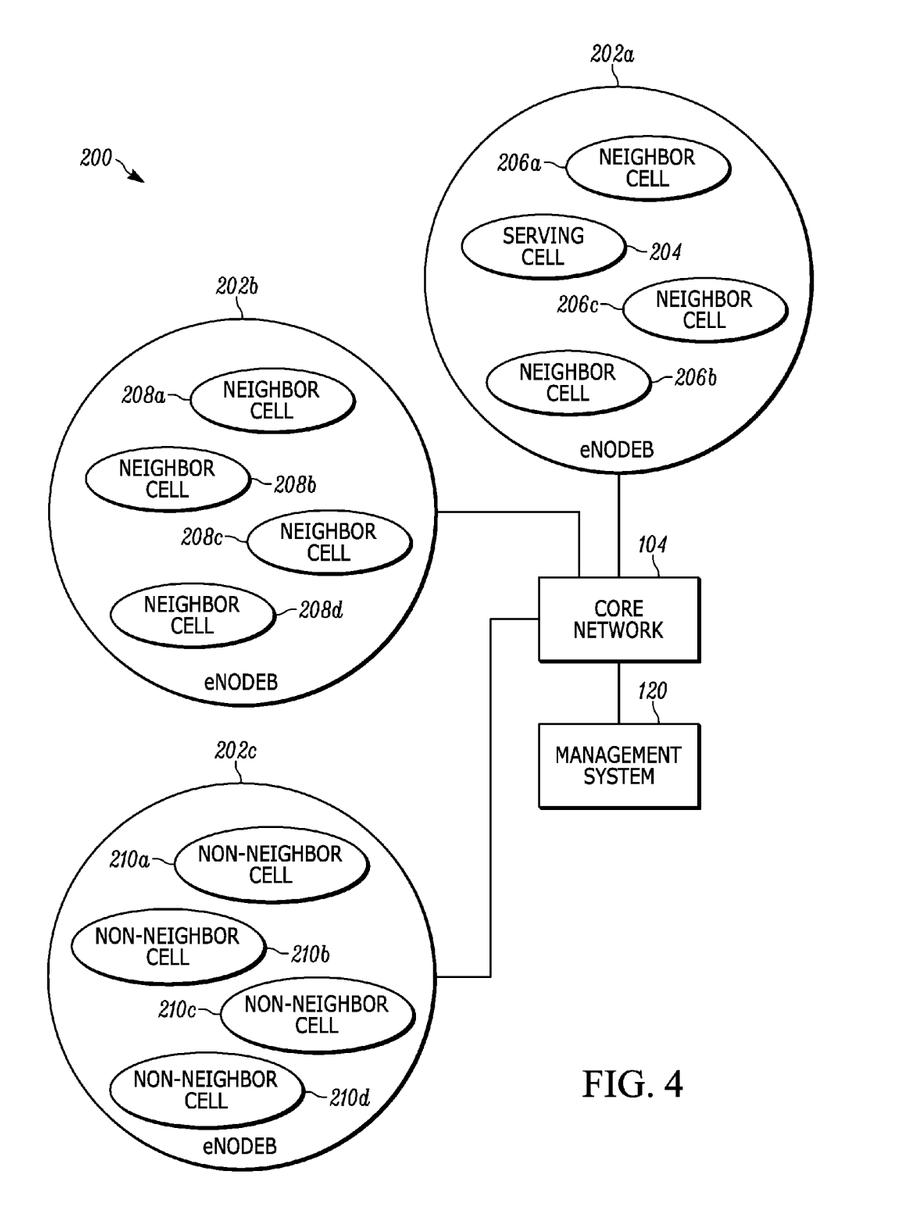
FIG. 4 illustrates a diagram of example cells in a communication network in accordance with some embodiments.

FIG. 4 includes a diagram 200 to illustrate the serving cell, neighbor cell, and non-neighbor cell nomenclature applicable to the system 100 of FIG. 1. The diagram 200 includes eNBs 202a, 202b, and 202c (generally, eNBs 202), each having four cells and each being in communication with the core network 104. In particular, one cell of the eNB 202a is referred to as the serving cell 204. The eNB 202a includes three other cells referred to as neighbor cells 206 (206a-c, respectively). Furthermore, eNB 202b includes four cells referred to as neighbor cells 208a-d (collectively, 208), and eNB 202c includes four cells referred as non-neighbor cells 210a-d (collectively, 210). As should be apparent, the serving cell and neighbor cell designations are relative terms. Accordingly, when considering the interference level of cell 206a, cell 206a would be considered the serving cell, and the other cells of eNB 202a (cells 204, 206b-c) would be neighbor cells.

The neighbor cells of the serving cell 204 include both those cells found at the same eNB (e.g., cells 206a-c) and cells at nearby eNBs within a neighbor cell distance threshold (e.g., cells 208). Cells outside the neighbor cell distance threshold, but that are part of the same communication network, are considered non-neighbor cells (e.g., cells 210). The value of the neighbor cell distance threshold depends on the range of wireless communications by the cells. The neighbor cell distance threshold can be a predetermined distance chosen such that (1) cells beyond the neighbor cell distance threshold will have minimal or no impact on the noise-rise at the serving cell and (2) cells within the neighbor cell distance threshold may impact the noise-rise at the serving cell. As an example, the neighbor cell distance threshold may be fifteen (15) kilometers.

Cells located at the same site are considered co-located because they have antennas positioned at the same geographic location. Cells having antennas on the same tower or within a predetermined distance of each other (e.g., 25 feet, 50 feet, or 100 feet) are considered co-located. In the illustrated example of FIG. 4, the serving cell 204 is co-located with neighbor cells 206a-c at eNB 202a, but the serving cell 204 is not co-located with neighbor cells 208a-d because they are at another site, eNB 202b. Cells that are part of the same eNB are often co-located (see, e.g., FIG. 4).

However, cells that are part of the same eNB can be considered to be differently located (i.e., not co-located) when the cells are located at different sites that are at least a predetermined distance apart from one another (e.g., more than 25 feet, 50 feet, or 100 feet apart).

Figure 5A:
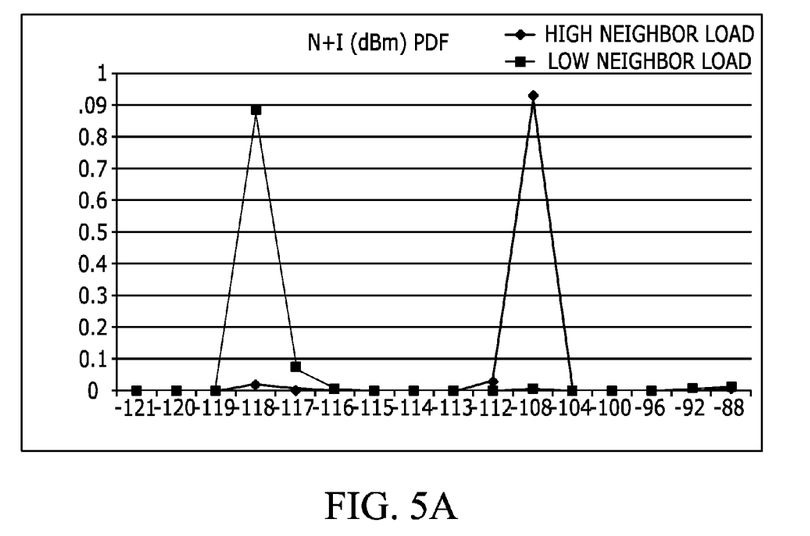
FIGS. 5A and 5B are plots illustrating a relationship between neighbor cell loading and interference.

LTE systems are typically deployed with a frequency reuse factor of one, in which case, the cells 126 of eNBs 102 of system 100 reuse the same carrier frequency. In other words, at a given moment, a first cell (e.g., 126a) communicating with a first user equipment may be using the same frequency resources as a nearby cell (e.g., cell 126b) to communicate with a second user equipment. Particularly because of this carrier frequency re-use, the level of interference that a particular cell will experience is impacted by the communication activity of nearby cells. Further, the more activity at a nearby cell, the more interference. For instance, FIG. 5A illustrates the distribution of noise and interference level measurements of a particular cell in a network with high neighbor cell loading in one line plot and low neighbor cell loading in a second line plot. As shown, when a cell has low neighbor cell loading (i.e., less communication activity), most noise and interference level measurements (approximately 90%) have a noise and interference level between −119 and −117 Decibel-milliwatts (dBm). However, when cells have high neighbor cell loading (i.e., more communication activity), most noise and interference level measurements (approximately 90%) have a noise and interference level between −112 and −104 dBm, which is a significant increase.

Figure 5B:
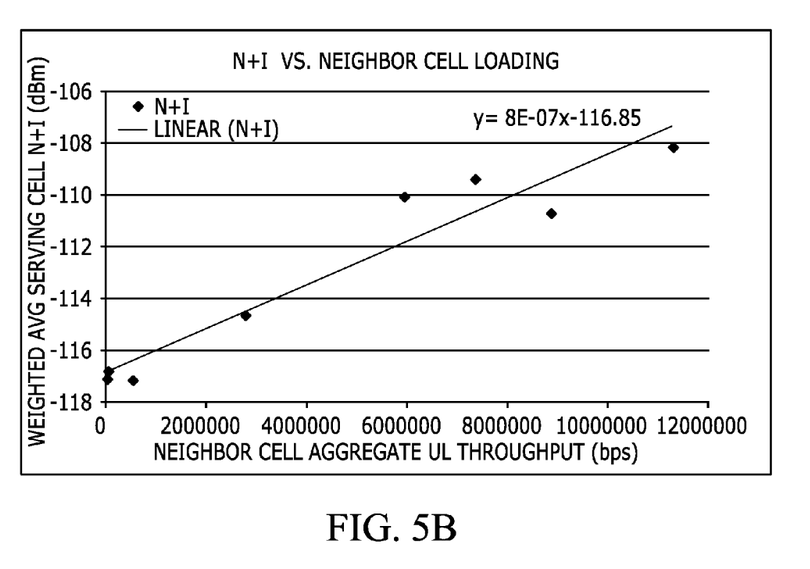

FIG. 5B illustrates a plot of the noise and interference levels of a particular cell (in dBm) versus the aggregate uplink throughput (in bits per second) of a co-located neighbor cell. As shown, generally, as the aggregate uplink throughput of a serving cell's neighbor cells increases, the noise and interference level experienced by the serving cell increases.

The management system 120 is configured to detect external interference in the uplink channel of a cell. When external interference is present, the noise and interference level that a particular cell experiences will increase. However, detecting whether external interference exists using a static threshold presents problems. The problems are caused, in part, because, as shown in FIGS. 5A-B, the noise and interference level experienced on the uplink channel of a particular cell can increase as a result of legitimate neighbor cell communications (also referred to as self-interference), not just external interference. Setting a static, high interference threshold to account for the worst-case neighbor cell interference contribution will result in not detecting external interference when light neighbor cell loading is present. On the other hand, setting a static, low interference threshold that does not take into account neighbor cell interference will result in false alerts caused by legitimate, neighbor cell communications.

As will be described in greater detail below, for each cell (serving cell), the management system 120 is configured to obtain and analyze cell data to estimate a noise-rise contribution from neighbor cells, generate a noise-rise threshold for the serving cell based on the estimate, and generate an alert indicating external uplink interference (via the alarm generator 258) when the serving cell has a noise-rise level that exceeds the generated noise-rise threshold. Accordingly, the management system 120 detects external interference at a serving cell using a dynamic or adaptive noise-raise threshold that varies based on neighbor cell loading.

Figure 6:
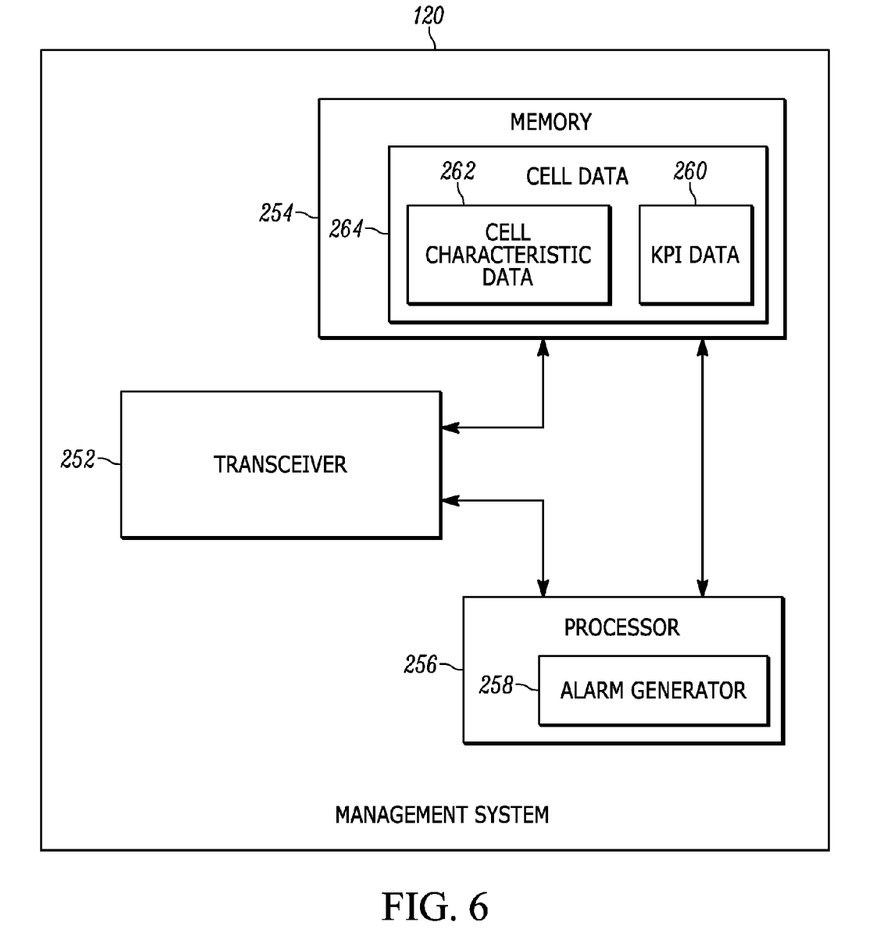
FIG. 6 illustrates a diagram of a management system shown in FIG. 1.

The management system 120 is configured to monitor one or more KPIs being measured at a specific network infrastructure element, for example, the serving gateway 114, the mobility management entity 116, one or more of the eNBs 102, or one or more of the cells 126. FIG. 6 is a block diagram of the management system 120 in accordance with some embodiments. Management system 120 includes a transceiver 252, a memory 254, and a processor 256, the processor including an alarm generator 258. Transceiver 252 is configured to receive data associated with each KPI being measured at a network infrastructure element on a predefined basis. For instance, every fifteen minutes or at the same time every day, transceiver 252 may receive KPI data 260 for each cell 126 indicating uplink physical layer resource utilization, aggregate uplink throughput statistics, and spectral efficiency.

The KPI data 260 may be received by the transceiver 252 in response to a request sent from the transceiver 252 to an eNB 102 (or other network infrastructure element) or a data transmission schedule may be set on the eNB 102 (or other network infrastructure element) so that the KPI data 260 is periodically sent automatically, without a new request for each transmission.

The management system 120 is further configured to receive cell characteristic data 262 including cell location (e.g. latitude and longitude), antenna azimuth, and path loss with respect to neighboring cells. While generally static, the cell location and antenna azimuth information may be received by the transceiver 252 from an eNB 102 periodically, either automatically or in response to a request from the management system 120, or entered manually by an operator configuring the management system 120. The path loss is an estimate of the path loss between (a) user equipment communicating with a neighbor cell and (b) the serving cell. The path loss estimates may be pre-calculated and stored in a database within the memory 254, rather than received via transceiver 252.

The obtained KPI data 260 and cell characteristic data 262 (collectively, cell data 264) are stored in the memory 254. In some embodiments, the memory 254 is a memory device separate from the processor 256, such as flash memory or a hard drive. However, in some embodiments, the memory 254 is a part of the processor 256, for example, in the form of a buffer or registers, and the memory 254 stores part or all of the cell data 264 temporarily for processing by the processor 256 as described below. Additionally, in these embodiments, another memory unit in communication with the processor 256 may be provided that stores the cell data 264 for longer-term storage.

Figure 7:
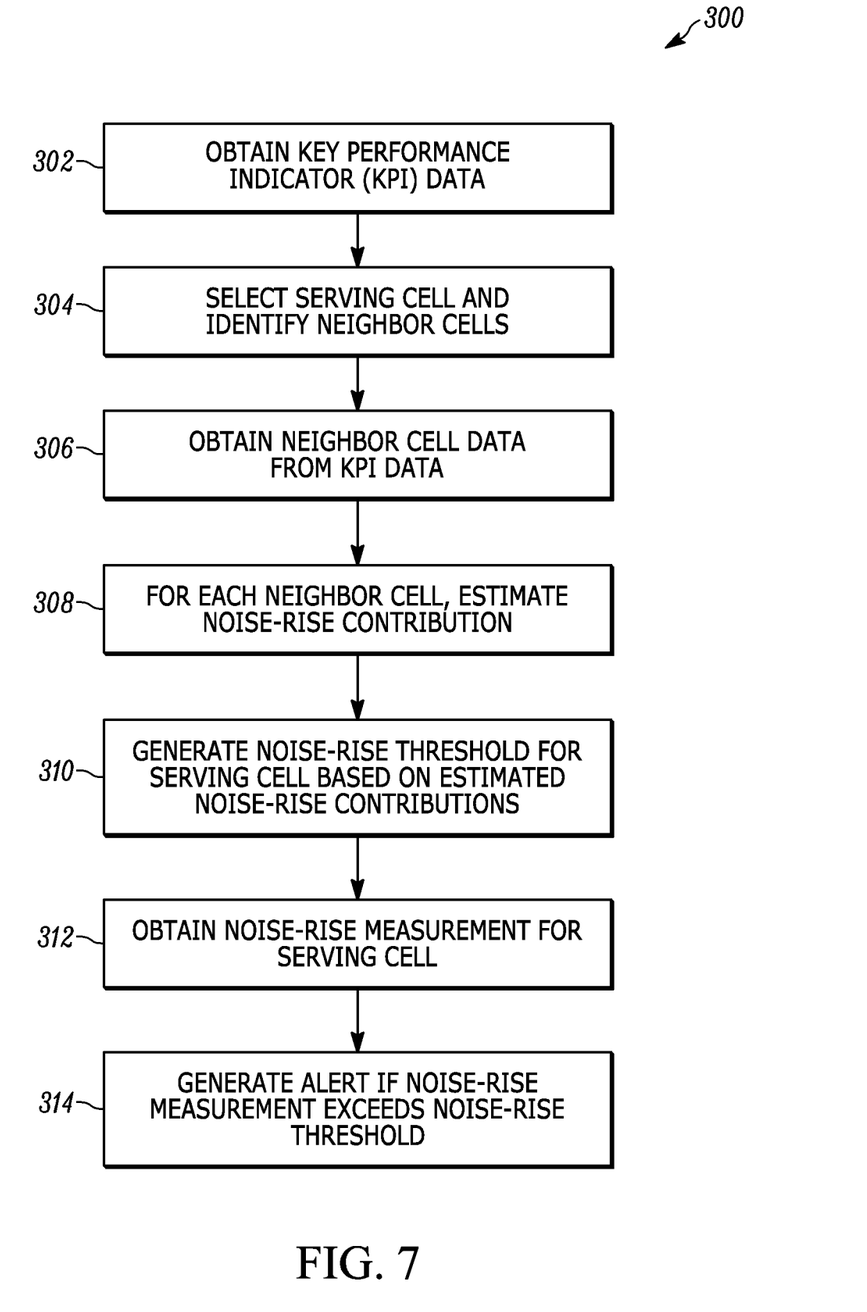
FIG. 7 is a flowchart of a method of detecting external interference in an uplink channel of a communication network in accordance with some embodiments.

FIG. 7 illustrates a method 300 for detecting external uplink interference in a cellular network (e.g., system 100). In step 302, the management system 120 obtains cell data 264, including KPI data 260 and cell characteristic data 262. The cell data 264 includes, for each cell 126, uplink physical layer resource utilization, aggregate uplink throughput statistics, spectral efficiency, path loss with respect to neighboring cells, cell location (e.g. latitude and longitude), and antenna azimuth. In step 304, the management system 120 selects one of the cells 126 as the serving cell and identifies other cells 126 that are neighbor cells of that selected serving cell. The selected cell is referred as a serving cell for purposes of the remaining steps of the method 300. As described above, for a given serving cell, its neighbor cells include both those cells found at the same eNB as the serving cell and at nearby eNBs within a neighbor cell distance threshold. The management system 120 is able to identify neighbor cells of the serving cell using the cell location information for both the serving cell and the other cells. For instance, the processor 256 is configured to calculate a distance between the cell location of the serving cell and the cell location of other cells 126. If the calculated distance for a particular cell 126 is less than the neighbor cell distance threshold, that particular cell 126 is considered a neighbor cell.

Step 302 may further include determining, based on the neighbor cell data, whether each neighbor cell is a co-located neighbor cell whose antennas are located at the same site as the serving cell or is a differently-located neighbor cell whose antennas are located at a different site.

In step 306, the processor 256 obtains neighbor cell data from the cell data 264. The neighbor cell data is a subset of the cell data 264 and includes, for each neighbor cell, uplink physical layer resource utilization, aggregate uplink throughput statistics, spectral efficiency, path loss with respect to neighboring cells, cell location, and antenna azimuth.

In step 308, the processor 256 estimates a noise-rise contribution at the serving cell caused by the neighbor cells of the serving cell. The estimation includes inferring the number and transmit power of user equipment transmitting in the uplink channel to each neighbor cell. Interference experienced at a serving cell due to co-channel user equipment communicating with a co-channel neighbor cell that is not co-located with the serving cell (i.e., located at a different site than the serving cell) is proportional to the following ratio of neighbor cell parameters:physical layer resource block (RB) utilization/(spectral efficiency*path loss between serving cell and neighbor cell). The spectral efficiency is proportional to the ratio of neighbor cell parameters:aggregate throughput/physical layer resource block utilization.

Accordingly, the noise-rise contribution for a neighbor cell (i) located at a different site is estimated using the following equation:

$$\text{Not Co-Located Noise-Rise Contribution} = c_1 \times \frac{r(i)^2}{a(i) \times pl(i)}$$

where r(i) is the physical layer RB utilization for cell i;
a(i) is the aggregate throughput for cell i;
pl(i) is the path-loss between cell i and the given cell; and
$c_1$ is a constant.

The noise-rise contribution for a neighbor cell located at the a same site can be estimated using the following equation:

$$\text{Co-Located Noise-Rise Contribution} = c_2 \times r(i)^2$$

where r(i) is the RB utilization for cell i; and
$c_2$ is a constant.

Accordingly, the total noise-rise contribution (I) at a serving cell from N neighbor cells (i) located at a different site and M neighbor cells (i) located at the same site is estimated using the following formula:

$$I = c_1 \sum_{i=1}^{N} \left[ r(i)^2 / (a(i) pl(i)) \right] + c_2 \sum_{i=1}^{M} r(i)^2$$

The parameters r(i) and a(i) are obtained from the KPI data 260 over select periods of time, e.g. 1 second, 1 minute, or 15 minutes. Path-loss (pl(i)) between the serving cell and user equipment communicating via a particular neighbor cell is obtained from the cell characteristic data 262. Path-loss (pl(i)) can be estimated based on the distance between the neighbor cell and the serving cell, along with an assumption about the environment (e.g. urban, suburban, or rural). The distance between the neighbor cell and serving cell can be calculated from the cell location information obtained from the cell data 264. Alternatively, propagation models, such as Hata-Okumura or a custom model, can be used to estimate path loss as well. Furthermore, the path-loss parameter may be based on direct measurement. Yet further, as noted above, the path loss estimates may be pre-calculated (e.g., using one of the above techniques) and then stored in a database in the memory 254 that is indexed, for example, using cell location data or other cell identifying information. The constants c1 and c2 are used to tune the expected noise-rise estimation. Using these equations to estimate noise-rise contributions, the management system 120 infers the quantity and transmit power of user equipment transmitting in the uplink channel to each neighbor cell.

In step 310, the processor 256 generates a noise-rise threshold for the serving cell based on the estimated noise-rise contributions from step 308. For instance, the noise-rise threshold for the serving cell may take a baseline threshold value and adjust the value based on the estimated noise-rise contribution. For example, the baseline threshold may be −115 dBm. If the estimated noise-rise contribution is significant (e.g., 12 dBm), the noise-rise threshold for the serving cell is set to −103 dBm (i.e., −115 dBm+12 dBm). Alternatively, if the estimated noise-rise contribution is minimal (e.g., 1 dBm), the noise-rise threshold for the serving cell is set to −114 dBm (i.e., −115 dBm+1 dBm). The noise-rise threshold may be generated using other techniques as well. However, generally, the larger the estimated noise-rise contribution, the higher the noise-rise threshold is set.

In step 312, the processor 256 obtains a noise-rise measurement for the serving cell. This noise-rise measurement may be obtained from the KPI data 260 obtained in step 302 or it may be obtained from KPI data received at a later time.

In step 314, the alarm generator 258 compares the noise-rise measurement to the noise-rise threshold and generates an alert if the noise-rise measurement exceeds the noise-rise threshold. Generating the alert to indicate external interference can take one or more forms. For instance, the alert may include sending an electronic communication (e.g., email or text message) to a remote device for display to a network operator. Additionally, the alert may be sent to the serving cell, wherein, in response, the serving cell requests that one or more user equipment increase a transmit power level.

The management system 120 is configured to repeat steps 304-314 for each cell in the network. In other words, each cell in the network takes a turn as the "serving cell" in method 300. Thus, while not shown, the method 300 may return to step 304, after step 314, to select a new serving cell and identify the neighbor cells of the newly selected serving cell, and then proceed through the remaining steps 306-314 for the new serving cell. The steps can be repeated until each cell in the network has been addressed.

Additionally, as transceiver 252 receives new cell data 264, processor 256 may start method 300 anew to update the thresholds and measurement values for each cell. For instance, the management system 120 is configured to re-start method 300 (e.g., starting back at the first selected serving cell) each time new cell data 264 is obtained. Alternatively, the management system 120 is configured to re-start method 300 at predetermined increments (e.g., every minute, every five minutes, or fifteen minutes), or on demand, initiated, for example, by the network operator.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of detecting external uplink interference at a serving cell comprising:
   identifying neighbor cells of the serving cell, the neighbor cells and the serving cell being part of a communication network;
   obtaining neighbor cell data associated with each of the neighbor cells;
   for each of the neighbor cells, estimating a noise-rise contribution resulting from communication received by each of the neighbor cells from one or more respective user devices based on the neighbor cell data associated with each of the neighbor cells;
   generating a noise-rise threshold for the serving cell based on the noise-rise contributions estimated for the neighbor cells;
   obtaining a noise-rise measurement at the serving cell; and
   generating an alert indicating external interference at the serving cell when the noise-rise measurement exceeds the noise-rise threshold.

2. The method of claim 1, wherein identifying neighbor cells of the serving cell includes
   determining a distance between each of the neighbor cells and the serving cell, and
   determining that the distance is within a neighbor cell distance threshold.

3. The method of claim 1, further comprising:
   determining, based on the neighbor cell data, that one of the neighbor cells is a co-located neighbor cell that is located at a first site with the serving cell; and
   determining, based on the neighbor cell data, that another of the neighbor cells is a differently-located neighbor cell that is located at a different site than the serving cell.

4. The method of claim 3, wherein estimating the noise-rise contribution based on the neighbor cell data for the differently-located neighbor cell includes calculating an estimated noise-rise contribution using
  a physical layer resource block utilization of the differently-located neighbor cell,
  an aggregate throughput of the differently-located neighbor cell, and
  a path-loss between the serving cell and the differently-located neighbor cell.

5. The method of claim 3, wherein estimating the noise-rise contribution based on the neighbor cell data for the co-located neighbor cell includes calculating an estimated noise-rise contribution using a physical layer resource block utilization of the co-located neighbor cell.

6. The method of claim 1, wherein estimating the noise-rise contribution of each neighbor cell includes:
  inferring, from neighbor cell data for the each neighbor cell, a quantity of user devices transmitting in an uplink physical layer to the neighbor cell; and
  inferring, from neighbor cell data for the each neighbor cell, a transmit power level of the user devices transmitting in the uplink physical layer to the neighbor cell.

7. The method of claim 1, wherein generating the alert indicating external interference includes at least one selected from the group of:
  sending an electronic communication to a remote device for display to a network operator; and
  sending the alert to the serving cell, wherein, in response, the serving cell requests that one or more user devices increase a transmit power level.

8. The method of claim 1, wherein the neighboring cell data associated with each of the neighbor cells includes uplink physical layer resource utilization of the neighbor cell.

9. The method of claim 8, wherein the neighbor cell data associated with each of the neighbor cells further includes:
  a location of the neighbor cell;
  an antenna azimuth of the neighbor cell; and
  aggregate uplink throughput statistics of the neighbor cell.

10. The method of claim 1, wherein the noise-rise contribution includes a noise increase at the serving cell caused by the one or more respective user devices transmitting in uplink channels to each of the neighbor cells.

11. A management system for detecting external uplink interference at a serving cell, the management system comprising:
  a transceiver in communication with a core network and periodically receiving performance indicators from the core network;
  a memory storing the performance indicators received by the transceiver, the performance indicators including information on cells that are in communication with the core network including the serving cell and neighbor cells of the serving cell;
  a processor in communication with the memory and transceiver and receiving the performance indicators, the processor analyzing the performance indicators to thereby
    identify the neighbor cells of the serving cell, the neighbor cells and the serving cell being part of a communication network;
    obtain neighbor cell data associated with each of the neighbor cells;
    for each of the neighbor cells, estimate a noise-rise contribution resulting from communication received by each of the neighbor cells from one or more respective user devices based on the neighbor cell data associated with each of the neighbor cells;
    generate a noise-rise threshold for the serving cell based on the noise-rise contributions estimated for the neighbor cells;
    obtain a noise-rise measurement at the serving cell; and
    generate an alert indicating external interference at the serving cell when the noise-rise measurement exceeds the noise-rise threshold.

12. The management system of claim 11, wherein identifying neighbor cells of the serving cell includes:
  determining, by the processor, the distance between each of the neighbor cells and the serving cell, and
  determining, by the processor, that the distance is within a neighbor cell distance threshold.

13. The management system of claim 11, wherein the processor further:
  determines, based on the neighbor cell data, that one of the neighbor cells is a co-located neighbor cell that is located at a first site with the serving cell; and
  determines, based on the neighbor cell data, that another of the neighbor cells is a differently-located neighbor cell that is located at a different site than the serving cell.

14. The management system of claim 13, wherein estimating the noise-rise contribution based on the neighbor cell data for the differently-located neighbor cell includes calculating an estimated noise-rise contribution using
  a physical layer resource block utilization of the differently-located neighbor cell,
  an aggregate throughput of the differently-located neighbor cell, and
  a path-loss between the serving cell and the differently-located neighbor cell.

15. The management system of claim 13, wherein estimating the noise-rise contribution based on the neighbor cell data for the co-located neighbor cell includes calculating an estimated noise-rise contribution using a physical layer resource block utilization of the co-located neighbor cell.

16. The management system of claim 11, wherein estimating the noise-rise contribution of each neighbor cell includes:
  inferring, from neighbor cell data for the each neighbor cell, a quantity of user devices transmitting in an uplink physical layer to the neighbor cell; and
  inferring, from neighbor cell data for the each neighbor cell, a transmit power level of the user devices transmitting in the uplink physical layer to the neighbor cell.

17. The management system of claim 11, wherein generating the alert indicating external interference includes at least one selected from the group of:
  sending an electronic communication to a remote device for display to a network operator; and
  sending the alert to the serving cell, wherein, in response, the serving cell requests that one or more user devices increase a transmit power level.

18. The management system of claim 11, wherein the neighboring cell data associated with each of the neighbor cells includes uplink physical layer resource utilization of the neighbor cell.

19. The management system of claim 18, wherein the neighbor cell data associated with each of the neighbor cells further includes:
  a location of the neighbor cell;
  an antenna azimuth of the neighbor cell; and
  aggregate uplink throughput statistics of the neighbor cell.

20. The management system of claim 11, wherein the noise-rise contribution includes a noise increase at the serving cell caused by the one or more respective user devices transmitting in uplink channels to each of the neighbor cells.

* * * * *